2,976,257
Patented Mar. 21, 1961

2,976,257

RE-DISPERSIBLE DISPERSION OF POLYTETRAFLUOROETHYLENE

Harold J. Dawe, Port Huron, Mich., and Earl L. Youse, Berkeley Heights, N.J., assignors to Acheson Industries, Inc., Port Huron, Mich., a corporation of Michigan No Drawing. Filed Jan. 24, 1958, Ser. No. 710,848

10 Claims. (Cl. 260—14)

This invention relates to dispersions of polytetrafluoroethylene which are suitable for the formation of dry film lubricant coatings on a variety of substrate surfaces. More specifically, this invention contemplates an improved partially stabilized dispersion of polytetrafluoroethylene particles and a thermosettable resinous material and a method of forming corrosion-resistant, adherent coatings therewith which employs curing temperatures substantially below the temperatures required to fuse polytetrafluoroethylene and yet forms adherent coatings having the lubricity that is characteristic of fused polytetrafluoroethylene films.

Heretofore the formation of polytetrafluoroethylene films on the surfaces of various articles for its lubrication value and its protective coating value has required the heat fusing of an applied film of the polytetrafluoroethylene. In order to form films of polytetrafluoroethylene which are continuous, it is necessary to employ fusing temperatures in the range of about 680° F. to about 750° F. and to maintain this temperature for at least a few minutes. When such temperatures are employed in fusing such a coating on metallic surfaces, such as brass, aluminum or ferrous metals, a detrimental decrease in the hardness of the substrate metals is effected and which decrease, in the cases of the brass and aluminum, may be as high as 50% of the initial hardness. Another disadvantage of attempting to coat surfaces with polytetrafluoroethylene by fusing the same is that a very poor bond results on many surfaces even after the fusing procedure has been completed in accordance with the most preferred practices. Moreover, it is impossible to form a film of polytetrafluoroethylene on many types of surfaces because many surfaces are incapable of withstanding the required fusing temperatures of the polytetrafluoroethylene, and this is true of such materials as wood, rubber, leather and the currently known plastic materials. Poor adherence is obtained between fused polytetrafluoroethylene films and the surfaces of various metals, including steel, or surfaces which have been treated to improve resistance to corrosion by chemical methods such as phosphate coatings, oxalate coatings, oxide coatings, etc.

It has also been recognized heretofore in the art that the attainment of a polytetrafluoroethylene film of substantial thickness is difficult even when the above described fusing procedures are followed and it has been suggested in Hochberg Patent No. 2,681,324 that relatively thick crack-free films can be obtained by forming aqueous dispersions of colloidal polytetrafluoroethylene and a variety of thermoplastic resins and applying a thick layer of this dispersion to the surface to be coated, air drying the coating, and thereafter heat fusing it at a temperature sufficient to fuse the polytetrafluoroethylene particles into a continuous film. Welch U.S. Patent No. 2,777,783 proposes that the problem of adhesion to substrate surfaces of various types can be solved by admixing a variety of resinous materials with a polyhalocarbon resin, in small particle form, before application to the surface to be coated. This patent discloses that such an adhesion-promoting extender resin must be capable of forming a strong bond with the surface to be coated and capable of withstanding the baking temperatures of the polyhalocarbon resin for the time necessary to fuse that resin on the surface, namely, from 400° F. to about 700° F. Additionally, the extender resin must be capable of forming dispersions in liquid media which are stable and homogeneous and which will not gel, flocculate, settle out, or otherwise change phase. The admixtures of polyhalocarbon resins and such extender resins are relatively concentrated dispersions containing a minimum of about 40% to 50% solids by weight. Such admixtures are applied in a plurality of successive layers and each layer is cured at temperatures exceeding the fusing temperature of the polyhalocarbon resin prior to the application of the covering layer. Each layer contains a greater proportion of polyhalocarbon than the layer it covers. The only resin suggested to be capable of withstanding the fusing temperature of polytetrafluoroethylene is a silicone resin.

All of the prior art suggestions are subject to the important defects which flow from the necessity of curing the coating on the surface at a temperature sufficient to fuse the polyhalocarbon resin, as above indicated, and to the further practical disadvantage that such procedure is expensive and time consuming.

It is therefore the primary object of this invention to provide a dispersion of polytetrafluoroethylene which is modified so that it can be applied and adhered to a solid substrate at temperatures substantially below the fusing temperature of polytetrafluoroethylene and yet which forms a corrosion-resistant coating characterized by lubricity and parting properties which are substantially similar to those characteristic of a fused polytetrafluoroethylene film.

Another important object of this invention is to provide a method for forming dry, adherent lubricating films containing polytetrafluoroethylene which forms a coating on the surface having lubricating, parting, and protecting properties which are characteristic of a fused polytetrafluoroethylene film but requires the use of temperatures substantially below the fusing temperature of polytetrafluoroethylene.

Another object of this invention is to provide a dispersion and method which enables the formation on a solid surface of a film containing polytetrafluoroethylene and comparable in properties thereto but which film contains a much smaller quantity of polytetrafluoroethylene than heretofore has been required to form a fused polytetrafluoroethylene film on such a surface.

Another important object is the provision of an improved liquid dispersion of finely divided polytetrafluoroethylene particles which in admixture with at least one thermosettable resinous material has a predetermined degree of stability or resistance to agitation which enables the composition to be applied by conventional means to solid surfaces at a time substantially subsequent to the time of formation of the dispersion and yet which forms a coating having characteristics of lubricity, parting and surface protection that are comparable to those characteristic of a fused polytetrafluoroethylene film.

A further object of this invention is to provide a polytetrafluoroethylene pigmented coating in a solid surface having the properties of lubricity, anti-stickiness and corrosion resistance which are characteristic of a fused polytetrafluoroethylene film, and which is further improved in the respect that it is receptive to printing inks.

In accordance with this invention it has now been found that the above and related objects are accomplished by preparing and forming a coating with a relatively dilute dispersion comprising finely divided polytetrafluoroethylene particles and at least one uncured thermosetting resin, and which dispersion contains a controlled quantity of total polytetrafluoroethylene and thermosetting resin solids. The thermosettable resinous component is present, relative to the polytetrafluoroethylene, in sufficient quantity to act as the continuous phase and as the adhering medium to the surface for supporting and holding therein the uniformly distributed polytetrafluoroethylene particles, or controlled size agglomerates, as the discontinuous phase. It has been surprisingly found that in order to obtain the desired degree of uniformity of distribution of the polytetrafluoroethylene particles in the thermosetting binder continuous phase, as applied to the surface and in the resulting coating, that it is necessary to employ a dispersion in which the sum of the polytetrafluoroethylene solids and thermosettable resin solids does not exceed about 25% by weight of the dispersion. Such dispersions containing total solids below about 25% by weight of the dispersion can be relatively easily applied by brushing, dipping or preferably by spraying to any of a plurality of types of substrate surfaces including wood, glass, plastics, metals, rubber, leather, etc., and upon curing the thermosetting carrier or binder resin, at its normal curing temperature, a film is formed which contains discrete, separated particles, or small-sized agglomerates, of polytetrafluoroethylene in the continuous thermoset resin binder and which has lubricating, parting and surface protecting properties similar to those which characterize a fused solid film of polytetrafluoroethylene.

The dispersion of this invention comprises polytetrafluoroethylene particles, at least one thermosetting resin, in uncured form, and a dispersing medium with the combined polytetrafluoroethylene and thermosettable resin solids of the dispersion being less than about 25% by weight of the dispersion. The dispersing medium may be water, or a solvent capable of dissolving the thermosettable resin or a mixture of such solvent with the water which is normally employed in forming a suspension of finely divided polytetrafluoroethylene particles. The polytetrafluoroethylene particles used herein are those which have been condensed or pluralized to an extent such that they are normally solid and are dispersible in a liquid medium such as water or organic suspending agent such as hydrocarbons, alcohols, esters, ketones, etc. and have a particle size of about 0.1 to about 3 microns, the predominant portion having a size of about 1 micron. The polytetrafluoroethylene pigment dispersions of this invention are prepared by incorporating finely divided dry powdered polytetrafluoroethylene particles of the approximate particle size above specified, or an aqueous dispersion thereof, into a dispersing medium which may be either water, a solution or dispersion of a thermosettable resin in water, or a thermosettable resin dissolved or dispersed in an organic solvent for the thermosettable resin.

The dispersion thus formed is stable for a period of time of sufficient length to make it a useful, practical and commercial product. It is preferred to use an aqueous suspension of colloidal polytetrafluoroethylene as the source of the polytetrafluoroethylene particles. An especially suitable starting material for this purpose is an aqueous suspension containing 60% polytetrafluoroethylene particles, of a size in the range of about 0.1 to about 3 microns, in water and which is available under the trade name "Teflon-30."

It has been found that thermosetting resins are superior to thermoplastic resins as the continuous phase in the coatings of this invention in the particulars that thermoset resins provide better adhesion to the surface being coated and to the polytetrafluoroethylene particles, provide better wear resistance and permit the resultant coatings to be used over a wider range of use conditions, particularly over more variant use temperatures. As above indicated, the total polytetrafluoroethylene and thermosetting resin solids in the dispersions of this invention should not exceed about 25% by weight of the dispersion and of these solids the polytetrafluoroethylene pigment may satisfactorily comprise between about 20% and about 80% by weight of the combined pigment and binder solids. When the polytetrafluoroethylene particles comprise less than about 20% by weight of the combined pigment and binder solids the resulting characteristics of the coating are somewhat inferior from the standpoint of lubricity and wear life and when the proportion of polytetrafluoroethylene particles exceeds about 80% by weight of the combined pigment and binder solids, the distribution of those particles in a coating tends to become less uniform. Proportions of polytetrafluoroethylene between 40% and 60% by weight of the combined pigment and binder solids are preferred.

The terms "thermosettable resins and thermosetting resins" as used herein and in the appended claims are intended in their normally understood sense, and to include all of the classes of specific resins, modified and unmodified and compatible admixtures thereof, which harden or cure when heated or oxidized into a permanent shape. This specifically includes the classes broadly designated the phenolic resins, the epoxy resins, the alkyd resins, the polyurethane resins, the petroleum or hydrocarbon resins, the amino resins, i.e., urea, melamine and triazine resins, and the thermoset silicone resins.

Phenolic resins which can be used satisfactorily include the condensation products of phenol or substituted phenols, such as cresol, resorcinol or butylphenol with aldehydes, such as formaldehyde, furfural, etc., and phenolic resins which have been modified with, for example, rosins, rosin esters, alkyds etc.

The urea formaldehyde resins are the condensation products of urea and formaldehyde or its polymers and the melamine resins are the condensation products of melamine and formaldehyde, and are particularly useful for leather or applications requiring hot water resistance.

Alkyd resins include both the saturated and unsaturated esters and polyesters of polybasic acids and polyhydric alcohols, such, for example, as the esters of maleic, fumaric, phthalic or adipic acid, etc., and a glycol, glycerol sorbitol, etc. These resins may be modified with the phenolics various drying or semi-drying oils, etc.

The epoxy resins broadly include the condensation products of the reaction of epichlorohydrin and bisphenols or bifunctional hydroxyl-containing compounds. These polymers can be modified satisfactorily with polyester resins, the phenolic resins, certain fatty acids and the like.

The polyurethane resinous materials are the interreaction products of a polyester and an isocyanate chosen to cure to a solid thermoset film, and preferably are the product of interreacting a saturated polyester and 2–4, tolylene di-isocyanate and its derivatives.

The suitable silicone resins are the thermoset alkyl silicones, such as methyl silicone having a $CH_3$ to Si ratio between about 1.2 and 1.5, or the ethyl silicones having a $C_2H_5$ to Si ratio between about 0.5 to about 1.5, or the alkyl-aryl silicones containing selected quantities of alkyl and aryl groups to give good adhesive and strength properties, such as methylphenyl silicone having about equal proportions of methyl and phenyl groups and a ratio to Si of about 1.8. The silicone oils and greases are not usable for the purposes of this invention.

The petroleum or hydrocarbon resins include a variety of straight chain, branched chain, and cyclic hydrocarbon polymers ranging in molecular weight from about 250 to about 900 and having an iodine number of about 40 to about 300.

These thermosetting resins may contain other modifiers such as conventional fillers, coloring agents, driers, and the like so long as the quantity thereof does not prevent the thermosetting resin, upon curing, from forming a strong bond both to the surface and to the polytetrafluoroethylene particles distributed therein.

The above specified dispersions containing the proportions indicated are satisfactory for all uses when applied relatively soon after compounding. It was found, however, that as the proportion of polytetrafluoroethylene was increased toward the indicated maximum of 80% of the total solids the tendency for the particles to agglomerate into larger particles increased and the adherence to the surface and to the polytetrafluoroethylene particles was undesirably decreased. In dispersions containing much higher proportions of polytetrafluoroethylene particles, sustained agitation, at room temperature, promoted, agglomeration to an extent which ultimately rendered the dispersion unusable for satisfactory coating formation. It was found that in order to decrease this tendency toward agglomeration and to formulate a one-package product capable of being used after substantial agitation and passage of time that the incorporation in the dispersions of a stabilizing agent was always desirable, and even necessary where the degree of agitation encountered prior to use was either violent for short times or moderate for extended times. Stabilizing agents which have been found to render the dispersions of this invention, as above defined, stable under such conditions are the vinyl resins and the cellulosic resins, when incorporated therein in an amount of about 5% to 15% by weight of the thermosettable resin content of the dispersion. When this proportion of a vinyl or cellulosic resin is present the polytetrafluoroethylene particles apparently agglomerate to a limited extent and reach an optimum size which is not enlarged under a degree of agitation comparable to that normally encountered in transporting by conventional means, to the intended site of use. The tendency to agglomerate is reduced, in the presence or absence of such a stabilizing agent, by lowering the temperature of the dispersion substantially below normal room temperature but above freezing and maintaining it at such lowered temperature in the range of about 35° F. to about 50° F. until it is applied. The vinyl resins which are suitable for this purpose include polyvinyl acetate, polyvinyl chloride, polyvinyl alcohol, polyvinyl acetal, polyvinyl butyral, polyvinyl formal and polyvinyl acetate-chloride copolymers. Of these materials somewhat better results are obtained from the use of polyvinyl butyral and its incorporation and use is therefore preferred. The cellulosic resins which may be satisfactorily used include cellulose acetate, cellulose nitrate, cellulose propionate, cellulose acetate butyrate, ethyl cellulose, methyl cellulose and carboxy methyl cellulose. It has been observed that in the presence of this quantity of such a stabilizing agent that the dispersions have a tendency to slowly settle, in the absence of agitation, and to ultimately constitute an upper layer of dispersing medium and a lower layer of agglomerated polytetrafluoroethylene particles.

These particles in the agglomerates remain discrete and unattached and can be returned to substantially the original form in the dispersion as prepared by merely gently agitating the settled solution. It has been further found that in order to obtain the desired coating characteristics when these modified dispersions are applied to various types of surfaces that the polytetrafluoroethylene particles should agglomerate to an extent that will bring about the settling of the polytetrafluoroethylene particles an amount in the range of about 1/5 to about 9/10 of the depth of the dispersion in a period of time between about 2 and 5 hours. Most of the settling occurs, in such modified dispersions, during the first 2 to 2½ hours, and after this time lapse the settling rate is greatly reduced and very little further observable settling occurs after about 5 hours. It has been found that unless the polytetrafluoroethylene particles settled a minimum of about 1/5 of the depth of the dispersion that the ultimately cured coating did not consist of polytetrafluoroethylene pigment in a continuous phase of resinous binder but rather the coating appears to be a more homogenous film and the resulting coating does not exhibit the low-friction characteristics which are desired for the purposes of this invention. Where the polytetrafluoroethylene particles settle more than about 9/10 of the depth of the dispersion the particles apparently attach themselves to one another to form stringers and larger agglomerates which are not redispersible, and if applied after such settling the resultant surface is relatively rough and the distribution of the polytetrafluoroethylene particles therein is less uniform than when the coating is formed from dispersions having settling tendencies of the polytetrafluoroethylene particles within the above specified range.

The dispersing medium may be solely water or as above indicated may be an admixture of an organic solvent capable of dissolving the particular resin involved in the dispersion in conjunction with water and usually with the quantity of water which normally is present in an aqueous suspension of the original polytetrafluoroethylene particles. Suitable organic solvents for the thermosettable resins encompassed by this invention are well known to those skilled in the art. Within the group of specific solvents which are available for use with the selected thermosetting resin, the final selection will be made to provide the most desirable drying rate, the greatest ease of handling and the least over-all cost.

When the solvent is an organic solvent and the polytetrafluoroethylene particles originally employed in the dispersion are in an aqueous-suspension form, it has been found that for certain thermosettable resins the indiscriminate admixture of the solvent, polytetrafluoroethylene particles and the stabilizing agent is unsatisfactory and produces undesirable premature agglomeration of the particles. In this case the compounding of the dispersion should use the sequence of first admixing the solvent with the stabilizing agent and thereafter adding the thermosetting resin and when this admixture is uniformly blended the polytetrafluoroethylene particles are added and blended to a uniform dispersion. When the dispersing medium is water the above given order for compounding the dispersions is not required and the ingredients may be blended in any desired order.

The dispersions of this invention may be applied to the desired substrate including metal, glass, wood, leather, rubber, and the like by brushing, spraying or dipping but the most suitable and commercial technique is to apply the dispersions by spraying. Pressure spraying is not as desirable as spraying with equipment which employs a separate gas for atomizing the dispersion and forcefully applying it to the surface to be coated. The coatings after application may be air-dried and additional coatings applied to build up the desired thickness of coating on the particular surface involved. For most applications a coating having the thickness in the range of about 0.1 to about 1.5 mils provides the most satisfactory over-all characteristics of lubricity, parting and corrosion resistance. A preferred coating thickness is one within the range of about 0.3 to about 0.8 mil. After the desired thickness of coating is obtained by the successive steps just described, the coating is finally cured by baking at a temperature which is sufficient to cure or thermoset the particular thermosettable resin which is present in the coating. Certain of the thermosetable resins, such as the alkyds, may be modified to include curing agents of a type which enable those resins to cure to a satisfactory adherent, pigment-retaining condition without using raised temperature conditions, and the use of such resins is preferred where raised temperature conditions are detrimental to the substrate in any way.

The dispersions of this invention are especially useful in forming coatings on metallic or nonmetallic surfaces for applications in which it is desirable to protect the surface against corrosion and/or lubricate the same. When applied in accordance with the above directions and the coating is properly cured so that polytetrafluoroethylene particles are present as the discontinuous phase in the continuous resin phase, the coatings have many uses as dry-film lubricants because they impart to the coated surfaces coefficient of friction which approach those that are characteristic of coatings resulting from the heat-fusing of polytetrafluoroethylene on the surfaces. Typical coefficients of friction which have been obtained with the dispersions of this invention lie in the range of about 0.035 to about 0.13. The coatings are especially useful as parting layers to prevent adhesion of other bodies to the coated surface and have utility for electrical-insulating and abrasion-resisting purposes. The coatings of this invention differ from coatings resulting from the fusing of polytetrafluoroethylene in that they readily accept printing inks.

The dispersions, the method of this invention and the resultant articles are illustrated in greater detail in the examples which illustrate typically usable materials and conditions for carrying out the method of this invention. It is to be understood that the examples do not measure the limits of the invention but are merely illustrative thereof.

*Example 1*

An aqueous dispersion of polytetrafluoroethylene pigment and a urea formaldehyde resin was formed by blending, in parts by weight, 25 parts of a 60% aqueous emulsion of polytetrafluoroethylene particles having an average size of about 1 micron and 30 parts of an aqueous solution containing 50 percent by weight of an alkylated urea formaldehyde condensation product, available commercially under the designation "Syn-U-Tex 405" and 65 parts water. This dispersion was then placed in a De Villbis spray gun, model MBC with a #30 tip and was sprayed on a plurality of 4" x 6" clean low carbon steel panels by using an air pressure between 25 and 50 lbs. sq. inch, the nozzle being 12"-30" from the panel. After a single spray application to the entire surface the panels were allowed to dry in air and were then cured at a temperature of about 375° F. in an oven for one hour, withdrawn and allowed to cool. An inspection of the panel surfaces showed that the surfaces were covered with a film having an average thickness of about 0.3 mil and the surface contained a fine lace network of polytetraflouroethylene particles which were substantially uniformly distributed in the continuous phase resin. The surfaces of a number of the panels were tested for coefficient of friction by observing the resistance of the surface to the slow reciprocation of a silicon carbide load surface thereover with the pressure of the silicon carbide load being 3260 p.s.i. The average coefficient of friction obtained was 0.08. The wear resistance of the coated surface was established by employing a Hartmann Tester with additional samples being prepared by the above procedure in the form of bearing races, the entire surface of which was coated with a continuous layer of the above type of coating. The coating was tested on the Hartmann instrument by loading the lever arm with a five-pound load. The bearing races so coated were found to have a wear life of 3½ hours and under identical conditions of test a plurality of similar bearing races coated with fused polytetrafluoroethylene films varying in thickness between 0.0002 and 0.0004 inch had wear lives varying between 1½ and 2½ hours.

Similar dispersions were prepared in which the relative proportions of polytetrafluoroethylene pigment and urea formaldehyde resin was changed from the 50–50 relationship of the above described dispersion. These dispersions contained the following:

| A | Parts by weight |
|---|---|
| 60% aqueous emulsion of polytetrafluoroethylene particles | 33.3 |
| Alkylated urea formaldehyde (Syn-U-Tex 405) | 10.0 |
| Water | 56.7 |

| B | Parts by weight |
|---|---|
| 60% aqueous emulsion of polytetrafluoroethylene particles | 8.3 |
| Alkylated urea formaldehyde (Syn-U-Tex 405) | 40.0 |
| Water | 51.7 |

These dispersions were sprayed on similar steel panels under the same conditions described above and after curing by comparable procedures were subjected to the same wear resistance test as above described. In both cases the wear life was one hour. In the absence of polytetrafluoroethylene particles the wear life of a urea formaldehyde resin film, conducted under the same wear test conditions, is a maximum of about 10 minutes.

*Example II*

The following dispersion was prepared to contain:

| | Parts by weight |
|---|---|
| Polyvinyl butyral | 1.1 |
| Stearyl dimethyl benzyl ammonium chloride | 1.1 |
| Toluene | 39.4 |
| n-Butyl alcohol | 19.7 |
| Phenolic resin (BK-3962-48 to 52% by weight of 100% phenolic resin solids in toluene) | 21.1 |
| Teflon-30 | 17.6 |

The above ingredients were blended by first admixing the polyvinyl butyral with the toluene, n-butyl alcohol and the stearyl dimethyl benzyl ammonium chloride, then admixing the phenolic resin solids therewith and finally blending in the Teflon-30 particles. This dispersion was tested for settling rate and it was found that after 5 hours 25% of the depth of the dispersion consisted of supernatant clear liquid. The dispersion was sprayed on a plurality of 4" x 6" low carbon steel panels with the same equipment and under identical conditions to those described in Example I. The sprayed coatings were dried in air and then cured in an oven for one hour at 300° F.–375° F. The cured surfaces were tested for coefficient of friction and the coefficient friction was found to be 0.07.

Another dispersion was compounded to contain all of the ingredients set forth above, in this example, except the polyvinyl butyral, with additional toluene substituted for the polyvinyl butyral. This dispersion settled one-tenth of its depth in five (5) hours. When the dispersion was sprayed under identical conditions on comparable panels and cured in a similar manner the resulting coating was seedy, that is it contained areas of non-uniformly distributed polytetrafluoroethylene particles so that it was rough to the touch. When the dispersion was moderately agitated for one hour it was badly flocculated and could not be sprayed whereas the above solution containing polyvinyl butyral was only slightly flocculated and satisfactory for spray application.

Another dispersion was formulated by blending the following ingredients in the order shown:

| | Parts by weight |
|---|---|
| Toluene | 23 |
| Ethylene glycol monoethyl ether acetate | 23 |
| Sodium dioctyl sulfo succinate (Aerosol OT-100%) | 0.7 |
| n-Butyl alcohol | 11.6 |
| Polyvinyl butyral | 1.5 |
| Epoxy ether resin—modified with 40% castor oil—50% solids in xylene (Dyal XOR-31—The Sherwin Williams Company) | 22.2 |
| Triazine resin—60% solids in xylene—butanol, 1:1 (U formite MX-60)* | 1.5 |
| Teflon-30 | 16.5 |

* Acid number solids basis—0.1, specific gravity—1.04, Gardner-Holdt viscosity, at 25° C.—G-K.

This dispersion settled so that .88 of its depth was supernatant liquid after 5 hours. Two hours moderate agitation left the dispersion in satisfactory form for spray application and after spraying and curing the resin at 300° F. for 30 minutes the surface was satisfactory and the coefficient of friction was .079.

A second dispersion was prepared identical to the epoxy ester-triazine resin dispersion, above described, except that the polyvinyl butyral was replaced by increasing the solvents a comparable amount. This dispersion settled so that 95% of its depth was supernatant liquid after 5 hours and upon moderate agitation, of comparable intensity to that used in the above similar dispersion, was found to be very badly flocculated after one hour and unsprayable.

Table I contains a large number of suitable formulations which illustrate the wide variety of variations in constituents, proportions and intermixtures of constituents which can be suitably used. The table compares these various formulations for settling properties, stability to agitation, the type of cured film and provides the average coefficient of friction on a plurality of surfaces. In all of these specific formulations the settling figure represents the proportion of the original depth which is clear supernatant liquid after 5 hours.

The stability to agitation column gives the relative stability of the various formulations after each was subjected to the following test: Two (2) ounces of the dispersion was placed in a 2 ounce standard jar and agitated in a ball mill having an 8⅝ inside diameter, the jars being secured in contact with the inner surface of the periphery of the mill rotating at 72 r.p.m. for one hour. The notation "O.K." represents no discernible change in stability, "S.F." represents slight flocculation and "F" represents complete flocculation. Slightly flocculated dispersions are sprayable whereas the completely flocculated dispersions are not.

The column labeled "Film Condition" refers to the characteristics of the cured coating on the substrate surface. "S" designates smoothness and "S" means perfectly smooth and S–1, S–2 and S–3 designate decreasing smoothness. The letter "L" designates a lace pattern resulting from the distribution of the polytetrafluoroethylene particles in the coating, the quantity and size of the polytetrafluoroethylene particles increasing from L–1 to L–3.

In each example the dispersions were formulated by following the compounding procedure described in Example II and a plurality of panels of the designated substrate were spray coated, relatively soon after the compounding, in accordance with the conditions set forth in Example I. In each case the dried coating was cured at the conventional curing temperature for the particular resin involved by lying within the range of about 250° F. to 450° F. for one-third of an hour to about one hour.

TABLE I

| Ex. | Resin | Resin class | Resin phase, parts by weight | | Stabilizing agents | Parts by weight |
|---|---|---|---|---|---|---|
| | | | Resin solids | Dispersing medium | | |
| 1 | AMS-3132—b [1] | Phenolic | 10.0 | 18.5 | Butvar B-76 [2] | 1.0 |
| 2 | Epi-Rez 201 [4] | Epoxy | 8.9 | 10.5 | Butvar B-76 | 0.9 |
| 3 | XAC-39 [5] | Alkyd | 11.2 | 12.1 | Butvar B-76 | 1.6 |
| | | | | | Aerosol OT [6] | 0.8 |
| 4 | Polyurethane 101 [7] | Polyurethane | 9.1 | 9.2 | Butvar B-76 | 1.4 |
| | | | | | Aerosol OT | 0.7 |
| 5 | C-Oil, E-11-K [8] | Hydrocarbon | 10.0 | | Butvar B-76 | 1.0 |
| | | | | | Aerosol OT | 1.0 |
| 6 | Syn-U-Tex-402 [9] | Amino | 9.1 | 6.1 | Butvar B-76 | 1.4 |
| 7 | DC-804 [10] | Silicone | 10.6 | 7.0 | Butvar B-76 | 1.1 |
| | | | | | Brij 35 [11] | 1.1 |
| 8 | AMS-3132-b | Phenolic | 4.6 | 8.6 | Butvar B-76 | 1.4 |
| | Syn-U-Tex 402 | Amino | 4.6 | 3.1 | Triton X-400 [12] | 0.7 |
| 9 | AMS-3132-b | Phenolic | 2.8 | 5.3 | Butvar B-76 | 1.4 |
| | Epi-Rez 201 | Epoxy | 6.8 | 8.2 | Triton X-400 | 0.7 |
| 10 | Enterprise 7927D [13] | Epoxy-phenolic | 8.8 | 16.0 | Butvar B-76 | 4.7 |
| | | | | | Triton X-400 | 1.2 |
| 11 | Epi-Rez 201 | Epoxy | 6.5 | 7.8 | Butvar B-76 | 1.3 |
| | Syn-U-Tex 402 | Amino | 2.7 | 1.8 | Triton X-400 | 0.7 |
| 12 | Epi-Rez 201 | Epoxy | 2.7 | 3.4 | Butvar B-76 | 1.3 |
| | Syn-U-Tex 402 | Amino | 6.4 | 4.3 | Triton X-400 | 0.7 |
| 13 | Styresol 4250 [14] | Alkyd, styrenated | 9.6 | 9.4 | Butvar B-76 | 1.4 |
| 14 | Plaskon 3256 [15] | Alkyd, modified | 9.6 | 9.4 | Butvar B-76 | 1.4 |
| 15 | Beckosol 1316 [16] | do | 9.6 | 9.4 | Butvar B-76 | 1.4 |
| 16 | Plaskon 6253 [17] | do | 10.1 | 14.9 | Butvar B-76 | 1.0 |
| | | | | | Brij 35 | 1.0 |
| 17 | St-847 [18] | Silicone-alkyd | 9.6 | 9.4 | Butvar B-76 | 1.4 |
| | | | | | Triton X-400 | 0.7 |
| 18 | Enterprise 7927D | Epoxy-phenolic | 18.8 | 36.2 | Butvar B-76 | 10.5 |
| | | | | | Aerosol OT | 2.3 |
| 19 | Staybelite [19] | Hydrogenated wood rosin | 9.7 | | Butvar B-76 | 1.0 |
| | | | | | Brij 35 | 1.0 |
| 20 | N-10 ethyl cellulose [20] | Ethyl cellulose | 10.7 | | Butvar B-76 | 1.1 |
| 21 | AMS-3132-b | Phenolic | 9.0 | 16.6 | Butvar B-76 | 0.9 |
| | Epi-Rez 201 | Epoxy | 1.0 | 1.2 | | |
| 22 | AMS-3132-b | Phenolic | 9.0 | 16.6 | Butvar B-76 | 0.9 |
| | Epi-Rez 201 | Epoxy | 1.0 | 1.2 | | |
| 23 | AMS-3132-b | Phenolic | 9.0 | 16.6 | Butvar B-76 | 0.9 |
| | Epi-Rez 201 | Epoxy | 1.0 | 1.2 | | |
| 24 | AMS-3132-b | Phenolic | 9.0 | 16.6 | Butvar B-76 | 0.9 |
| | Epi-Rez 201 | Epoxy | 1.0 | 1.2 | | |
| 25 | AMS-3132-b | Phenolic | 9.0 | 16.6 | Butvar B-76 | 0.9 |
| | Epi-Rez 201 | Epoxy | 1.0 | 1.2 | | |
| 26 | AMS-3132-b | Phenolic | 9.0 | 16.2 | Butvar B-76 | 0.9 |
| | Epi-Rez 201 | Epoxy | 1.0 | 1.2 | | |
| 27 | AMS-3132-b | Phenolic | 9.0 | 16.6 | Butvar B-76 | 0.9 |
| | Epi-Rez 201 | Epoxy | 1.0 | 1.2 | | |
| 28 | AMS-3132-b | Phenolic | 9.0 | 16.6 | Butvar B-76 | 0.9 |
| | Epi-Rez 201 | Epoxy | 1.0 | 1.2 | | |
| 29 | DC-804 | Silicone | 10.6 | 7.0 | Butvar B-76 | 1.1 |
| | | | | | Aerosol OT | 1.1 |
| 30 | Epi-Rez 201 | Epoxy | 2.7 | 3.4 | Butvar B-76 | 1.3 |
| | Syn-U-Tex 402 | Urea-formaldehyde | 6.4 | 4.3 | Brij 35 | .7 |

TABLE I—Continued

| Ex. | Solvents | Parts by weight | Pigment phase, Teflon 30, parts by weight | | Dispersion results | | Film results | | | Substrate |
|---|---|---|---|---|---|---|---|---|---|---|
| | | | Pigment solids | Dispersing medium | 5 hour settling | Stability to agitation | Film condition | Film thickness, inches | Coefficient of friction | |
| 1 | Cellosolve acetate [3]<br>Toluol<br>Butanol | 21.6<br>21.6<br>10.7 | 10.0 | 6.6 | 0.25 | SF | L-1 | 0.0003 | 0.077 | Steel. |
| 2 | Cellosolve acetate<br>Toluol<br>Butanol | 26.0<br>26.0<br>12.9 | 8.9 | 5.9 | 0.51 | OK | S | 0.0003 | 0.067 | Do. |
| 3 | Xylol<br>Butanol | 38.3<br>18.4 | 11.2 | 7.4 | 0.45 | SF | L-2 | 0.0003 | | Do. |
| 4 | Xylol<br>Butanol | 42.9<br>21.5 | 9.1 | 6.1 | 0.40 | SF | L-3 | 0.0003 | 0.076 | Do. |
| 5 | Xylol<br>Butanol | 53.4<br>17.8 | 10.1 | 6.7 | 0.73 | OK | L-2 | 0.0003 | 0.073 | Do. |
| 6 | Cellosolve acetate<br>Toluol<br>Butanol | 27.2<br>27.2<br>13.7 | 9.1 | 6.1 | 0.58 | OK | S-1 | 0.0003 | 0.082 | Do. |
| 7 | Xylol<br>Butanol | 41.7<br>20.9 | 10.6 | 7.0 | 0.80 | OK | L-2 | 0.0003 | 0.066 | Do. |
| 8 | Cellosolve acetate<br>Toluol<br>Butanol | 24.7<br>24.7<br>12.3 | 9.2 | 6.1 | 0.52 | SF | L-1 | 0.0003 | 0.065 | Do. |
| 9 | Cellosolve acetate<br>Toluol<br>Butanol | 23.5<br>23.5<br>11.8 | 9.6 | 6.4 | 0.39 | SF | S-1 | 0.0003 | 0.074 | Do. |
| 10 | Methyl-isobutyl-ketone<br>Butanol<br>Xylol | 20.5<br>20.5<br>13.7 | 8.8 | 5.8 | 0.48 | SF | S | 0.0003 | 0.069 | Phosphated steel. |
| 11 | Cellosolve acetate<br>Toluol<br>Butanol | 25.6<br>25.6<br>12.8 | 9.1 | 6.1 | 0.50 | OK | L-1 | 0.0003 | 0.072 | Steel. |
| 12 | Cellosolve acetate<br>Toluol<br>Butanol | 26.7<br>26.7<br>13.3 | 9.1 | 6.1 | 0.55 | OK | L-1 | 0.0003 | 0.078 | Do. |
| 13 | Xylol<br>Butanol | 43.0<br>21.4 | 9.6 | 6.4 | 0.32 | SF | L-2 | 0.0003 | 0.065 | Do. |
| 14 | Xylol<br>Butanol | 42.7<br>20.9 | 9.6 | 6.4 | 0.23 | SF | L-2 | 0.0003 | 0.068 | Do. |
| 15 | Xylol<br>Butanol | 42.7<br>20.9 | 9.6 | 6.4 | 0.55 | SF | L-2 | 0.0003 | 0.069 | Do. |
| 16 | Xylol<br>Butanol | 37.5<br>18.0 | 10.1 | 6.7 | 0.89 | SF | S-1 | 0.0003 | 0.069 | Do. |
| 17 | Xylol<br>Butanol | 42.0<br>20.9 | 9.6 | 6.4 | 0.43 | OK | S-1 | 0.0003 | 0.077 | Do. |
| 18 | | | 18.3 | 13.9 | 0.00 | F | (a) | | | |
| 19 | Toluol<br>Butanol<br>Ethanol | 27.0<br>27.0<br>18.0 | 9.8 | 6.5 | 0.08 | F | S | 0.0003 | | Do. |
| 20 | Toluol<br>Ethanol | 20.0<br>50.2 | 10.8 | 7.2 | 0.02 | SF | S-2 | 0.0003 | | Do. |
| 21 | Cellusolve acetate<br>Toluol<br>Butanol | 22.7<br>22.7<br>11.3 | 8.8 | 5.8 | | | L-1 | 0.0003 | 0.050 | Do. |
| 22 | Cellusolve acetate<br>Toluol<br>Butanol | 22.7<br>22.7<br>11.3 | 8.8 | 5.8 | | | L-1 | 0.0003 | 0.067 | Glass. |
| 23 | Cellusolve acetate<br>Toluol<br>Butanol | 22.7<br>22.7<br>11.3 | 8.8 | 5.8 | | | L-1 | 0.0005 | 0.102 | Rubber. |
| 24 | Cellusolve acetate<br>Toluol<br>Butanol | 22.7<br>22.7<br>11.3 | 8.8 | 5.8 | | | L-1 | 0.0003 | 0.051 | Plastic. |
| 25 | Cellusolve acetate<br>Toluol<br>Butanol | 22.7<br>22.7<br>11.3 | 8.8 | 5.8 | | | L-1 | 0.0003 | 0.069 | Aluminum. |
| 26 | Cellusolve acetate<br>Toluol<br>Butanol | 22.7<br>22.7<br>11.3 | 8.8 | 5.8 | | | L-1 | 0.0003 | 0.071 | Brass. |
| 27 | Cellusolve acetate<br>Toluol<br>Butanol | 22.7<br>22.7<br>11.3 | 8.8 | 5.8 | | | L-1 | 0.0008 | 0.060 | Wood. |
| 28 | Cellusolve acetate<br>Toluol<br>Butanol | 22.7<br>22.7<br>11.3 | 8.8 | 5.8 | | | L-1 | 0.0005 | | Leather. |
| 29 | Xylol<br>Butanol | 41.7<br>20.9 | 10.6 | 7.0 | 0.06 | F | R | 0.0007 | 0.123 | Steel. |
| 30 | Cellusolve acetate<br>Toluol<br>Butanol | 26.7<br>26.7<br>13.3 | 9.2 | 6.0 | 0.92 | F | R | 0.0007 | 0.123 | Do. |

[1] AMS-3132-B is a phenol-formaldehyde resin corresponding to the specification published by the Society of Automotive Engineers, "Varnish, Synthetic Resin, Corrosion Preventative," June 15, 1952, and is a phenol-formaldehyde thermosetting resinous product having 28%-32% solids in an organic solvent, and containing about 0.1% blue dye.

[2] Butvar B-76 is the polyvinyl butyral marketed by the Bakelite Company, a Division of Union Carbide and Carbon Corporation.

[3] Cellosolve Acetate is ethylene glycol monoethyl ether acetate, marketed by Union Carbide and Carbon Corporation.

[4] Epi-Rez 201 designates a 45% solids organic solvent solution of what is understood to be an epoxy containing phenolic ether resin having a 1,2 epoxy equivalency greater than 1, combined with proper curing agents to cure at elevated temperatures, and available from Jones-Dabney Company.

[5] XAC-39 is a 50% solution in xylene of a 41% soya oil modified phthalic anhydride alkyd resin product, marketed by The Sherwin-Williams Company.

[6] Aerosol OT is a dioctyl ester of sodium sulfo succinic acid, marketed by the American Cyanamide Company.

Other notes continued on following page

TABLE I FOOTNOTES—Continued

[7] Polyurethane 101 designates a 50% solution in mineral spirits of an oil modified polyurethane resin product having a Gardner-Holdt viscosity of $Z_1$-$I_3$, a color of 7-9 Gardner scale, an acid value 2 maximum, and available from Cargill, Incorporated.

[8] C-Oil (E-11-K) designates a 50% thermosetting hydrocarbon resin product in mineral spirits, having a Garner-Holdt viscosity of I to K, a Gardner color of 4 or less, an acid number of 3-4 and marketed by Enjay Company, Inc.

[9] Syn-U-Tex 402 designates a 60% solids solution of an alkylated urea-formaldehyde condensation product having an acid value of 3 maximum, a Gardner-Holdt viscosity of V-Y in 7 Butanol: 1 Xylol and marketed by Jones-Dabney Company.

[10] DC-804 designates a 60% solution in toluene of a thermosetting silicone resin which forms a hard, water-resistant film, and has a Gardner-Holdt viscosity of A-3 to A, a Gardner color of 2 maximum, and marketed by the Dow Corning Corporation.

[11] Brij 35 is a polyoxyethylene lauryl ether marketed by the Atlas Powder Company.

[12] Triton X-400 is a 25% solution of stearyl dimethyl benzyl ammonium chloride in water, marketed by the Rohm and Haas Company.

[13] Enterprise 7927D designates a 35% solution in an organic solvent of an epoxy modified phenol-formaldehyde resin product conforming to specification MIL-V-12276A, Type III and marketed by the Enterprise Paint Manufacturing Company.

[14] Styresol 4250 designates a 50% solution in xylene of a styrenated alkyd resin product having a Gardner-Holdt viscosity of S-U, a Gardner color of 2-5, an acid number of 4-8 and marketed by Reichhold Chemicals, Inc.

[15] Plaskon 3256 designates a 50% solution in xylene of a rosin modified linseed oil alkyd resin product having a Gardner-Holdt viscosity of Y-$Z_2$, an acid number of 10-15, a Gardner color of 9-13 and marketed by The Barrett Division of Allied Chemical and Dye Corporation.

[16] Beckosol 1316 designates a 50% solution in toluene of a rosin and phenolic modified linseed-tung oil alkyd resin product having a Gardner-Holdt viscosity of D-G, a Gardner color of 9-12, an acid number of 8-12 and marketed by Reichhold Chemicals, Inc.

[17] Plaskon 6253 designates a 50% solution in xylene of a linseed oil, modified alkyd resin having an acid number of 6-13, a Gardner-Holdt viscosity of O-Q and marketed by The Barrett Division of Allied Chemical and Dye Corporation.

[18] ST-847 designates a 55% solution in xylene of a thermosetting silicone modified alkyd resin product having a Gardner-Holdt viscosity of U-Z, an acid number of 1-4, a Gardner color of 7-11, and marketed by The Barrett Division of Allied Chemical and Dye Corporation.

[19] Staybelite designates a pale colored thermoplastic, acidic resin made by the hydrogenation of wood oil having an acid number of 162, thiocyanogen value of 35, a density of 1.045, a saponification number of 167, and manufactured by the Hercules Powder Company.

[20] N-10 Ethyl Cellulose designates a cellulose ether prepared by the reaction of ethyl chloride with an alkali cellulose having an ethoxyl content of at least 49%, and at least 2.53 ethoxyl groups per anhydroglucose unit and marketed by the Hercules Powder Company.

\* Not sprayable.

Syn-U-Tex 405 designates a water soluble urea formaldehyde resin containing 60% solids, having an acid value of 0.7, a Gardner color of 1 plus, a Gardner-Holdt viscosity of F-G at 50% non volatiles and available from Jones-Dabney Company.

Other satisfactory dispersions for the purposes of this invention follow.

*Example III*

| | Parts by weight |
|---|---|
| Toluene | 22.0 |
| n-Butyl alcohol | 10.0 |
| Methyl isobutyl ketone | 20.0 |
| Ethylene glycol monoethyl ether acetate | 10.5 |
| Admixture of aerosol OT[6] and polyvinyl butyral—ratio 1 : 1 | 1.6 |
| Epi-Rez 201[4] | 7.6 |
| Syn-U-Tex 402[9] | 13.8 |
| Teflon-30 | 14.5 |

*Example IV*

| | Parts by weight |
|---|---|
| Aerosol OT[6] and polyvinyl butyral admixed in the ratio of 1 : 1 | 1.6 |
| Denatured alcohol | 75.0 |
| Phenol-formaldehyde resin—BV-1600\* | 12.8 |
| Teflon-30 | 10.6 |

\* BV-1600 designates a 52% to 56% solids solution of a 100% phenol-formaldehyde resin in ethanol having a Gardner color of 7 maximum, a viscosity of 600-1000 cps. and available from The Bakelite Company.

NOTE.—For footnotes 4, 6, and 9 see footnotes to Table I.

The stability of the dispersion and the uniformity of distribution of the polytetrafluoroethylene particles in the resulting cured coatings of this invention are further improved, in certain instances, by the incorporation in the dispersion in addition to the above described stabilizing agent, of a surface-active agent in an amount of from about 10% to about 100% of that stabilizing agent. The specific surface-active agent which is most effective in a particular dispersion is dependent on one or more of the following variables including the thermosettable resin which is present, the quantity of such resin, the quantity of polytetrafluoroethylene particles present, the compatibility of the thermosettable resins in the case of mixtures thereof, etc., but it has been demonstrated that anionic, cationic or non-ionic types can be used in the dispersions of this invention. Examples of Table I which indicate this utility are Examples 8 and 29; Examples 12 and 30; and Examples 9 and 21.

This application is a continuation-in-part of our co-pending U.S. application, Serial No. 640,597, filed February 18, 1957, now abandoned.

What is claimed is:

1. A re-dispersible dispersion comprising finely divided polytetrafluoroethylene, at least one thermosettable resin dissolved in a solvent, said dispersion containing less than about 25% combined polytetrafluoroethylene and thermosettable resin solids, by weight of said dispersion, and at least about 5% to about 15% of a stabilizing agent selected from the group consisting of vinyl resins and cellulosic resins, by weight of said said thermosettable resin, said dispersion having the characteristic of settling an amount in the range of about one-fifth to about nine-tenths of the depth of said dispersion in two to five hours.

2. A dispersion as claimed in claim 1 wherein said stabilizing agent is selected from the group consisting of polyvinyl acetate, polyvinyl chloride, polyvinyl alcohol, polyvinyl acetal, polyvinyl butyral, polyvinyl formal, polyvinyl acetate-chloride co-polymers, cellulose acetate, cellulose nitrate, cellulose propionate, ethyl cellulose, cellulose acetate butyrate, methyl cellulose, carboxyl methyl cellulose and cellulose propionate.

3. A dispersion as claimed in claim 2 wherein said stabilizing agent is polyvinyl butyral.

4. A dispersion as claimed in claim 2 containing, in addition, a small amount of a surface-active agent.

5. A re-dispersible dispersion containing finely divided polytetrafluoroethylene, at least one phenolic resin and a dispersing medium and at least 5% to about 15% of a stabilizing agent selected from the group consisting of vinyl resins and cellulosic resins, by weight of said phenolic resin, said dispersion containing less than about 25% combined polytetrafluoroethylene and phenolic resin solids, by weight of said dispersion, and said polytetrafluoroethylene constituting between about 20% and about 80% by weight of the combined phenolic resin and polytetrafluoroethylene solids.

6. A re-dispersible dispersion containing finely divided polytetrafluoroethylene, at least one urea formaldehyde resin and a dispersing medium and at least 5% to about 15% of a stabilizing agent selected from the group consisting of vinyl resins and cellulosic resins, by weight of said urea formaldehyde resin, said dispersion containing less than about 25% combined polytetrafluoroethylene and urea formaldehyde resin solids, by weight of said dispersion, and said polytetrafluoroethylene constituting between about 20% and about 80% by weight of the combined ureaformaldehyde resin and polytetrafluoroethylene solids.

7. A re-dispersible dispersion containing finely divided polytetrafluoroethylene, at least one alkyd resin and a dispersing medium and at least 5% to about 15% of a stabilizing agent selected from the group consisting of vinyl resins and cellulosic resins, by weight of said alkyd resin, said dispersion containing less than about 25% combined polytetrafluoroethylene and alkyd resin solids, by weight of said dispersion, and said polytetrafluoroethylene constituting between about 20% and about 80% by weight of the combined alkyd resin and polytetrafluoroethylene solids.

8. A re-dispersible dispersion containing finely divided polytetrafluoroethylene, at least one epoxy resin and a dispersing medium and at least 5% to about 15% of a stabilizing agent selected from the group consisting of vinyl resins and cellulosic resins, by weight of said epoxy resin, said dispersion containing less than about 25% combined polytetrafluoroethylene and epoxy resin solids by weight of said dispersion, and said polytetrafluoroethylene constituting between about 20% and about 80% by weight of the combined epoxy resin and polytetrafluoroethylene solids.

9. A re-dispersible dispersion containing finely divided polytetrafluoroethylene, at least one polyurethane resin and a dispersing medium and at least 5% to about 15% of a stabilizing agent selected from the group consisting of vinyl resins and cellulosic resins, by weight of said polyurethane resin, said dispersion containing less than about 25% combined polytetrafluoroethylene and polyurethane resin solids, by weight of said dispersion, and said polytetrafluoroethylene constituting between about 20% and about 80% by weight of the combined polyurethane resin and polytetrafluoroethylene solids.

10. A re-dispersible dispersion containing finely divided polytetrafluoroethylene, at least one alkyl silicone resin and a dispersing medium and at least 5% to about 15% of a stabilizing agent selected from the group consisting of vinyl resins and cellulosic resins, by weight of said alkyl silicone resin, said dispersion containing less than about 25% combined polytetrafluoroethylene and alkyl silicone resin solids by weight of said dispersion, and said polytetrafluoroethylene constituting between about 20% and about 80% by weight of the combined alkyl silicone resin and polytetrafluoroethylene solids.

References Cited in the file of this patent

UNITED STATES PATENTS

| | | |
|---|---|---|
| 2,562,118 | Osdal | July 24, 1951 |
| 2,612,484 | Bankoff | Sept. 30, 1952 |
| 2,668,157 | Emig et al. | Feb. 2, 1954 |
| 2,681,324 | Hochberg | June 15, 1954 |
| 2,754,223 | Caroselli | July 10, 1956 |
| 2,777,783 | Welch | Jan. 15, 1957 |
| 2,806,256 | Johannsen | Sept. 17, 1957 |
| 2,825,706 | Sanders | Mar. 4, 1958 |
| 2,844,557 | Welch | July 22, 1958 |